United States Patent
Mayer et al.

(10) Patent No.: US 11,801,628 B2
(45) Date of Patent: Oct. 31, 2023

(54) METHOD FOR PRODUCING HOLLOW BODIES MADE OF PLASTICS

(71) Applicant: KAUTEX TEXTRON GMBH & CO. KG, Bonn (DE)

(72) Inventors: Thomas Mayer, Leverkusen (DE); Jochen Hild, Bonn (DE); Verena Thimm, Eitorf (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 319 days.

(21) Appl. No.: 16/651,714

(22) PCT Filed: Sep. 21, 2018

(86) PCT No.: PCT/EP2018/075636
§ 371 (c)(1),
(2) Date: Mar. 27, 2020

(87) PCT Pub. No.: WO2019/063435
PCT Pub. Date: Apr. 4, 2019

(65) Prior Publication Data
US 2020/0254677 A1 Aug. 13, 2020

(30) Foreign Application Priority Data
Sep. 29, 2017 (DE) ...................... 10 2017 217 468.4

(51) Int. Cl.
*B29C 49/78* (2006.01)
*B29C 49/04* (2006.01)
*B29L 22/00* (2006.01)

(52) U.S. Cl.
CPC .............. *B29C 49/78* (2013.01); *B29C 49/04* (2013.01); *B29L 2022/00* (2013.01)

(58) Field of Classification Search
CPC ..... B29C 49/0073; B29C 49/04; B29C 49/78; B29C 2949/78605; B29C 2949/78092; B29L 2022/00
See application file for complete search history.

(56) References Cited

U.S. PATENT DOCUMENTS

| 7,887,742 B2 | 2/2011 | Linke et al. |
| 10,343,326 B2 | 7/2019 | Knapp et al. |
| 2006/0141184 A1* | 6/2006 | Rohde ....................... B32B 1/02 264/534 |

FOREIGN PATENT DOCUMENTS

| DE | 102007030369 | 1/2009 |
| DE | 102008052608 | 5/2010 |

(Continued)

OTHER PUBLICATIONS

JP 3231457 English translation.*
(Continued)

*Primary Examiner* — Larry W Thrower
(74) *Attorney, Agent, or Firm* — Grossman, Tucker, Perreault & Pfleger, PLLC

(57) ABSTRACT

A method for producing hollow bodies made of plastics by blow molding or deep drawing using a deep-drawing tool or a blow-molding tool, comprising the extrusion of preforms from thermoplastics, the method comprising a wall thickness control of the preforms, wherein a measurement of the wall thickness of the preforms takes place within the tool on the mold cavity side on at least one reference point of a preform, the measured value obtained is compared as an actual value with a predetermined target value and the wall thickness control is triggered to change the wall thickness of the preform during extrusion or between extrusion cycles depending on the deviation between the actual value and the target value.

19 Claims, 1 Drawing Sheet

(56) References Cited

FOREIGN PATENT DOCUMENTS

| EP | 3037242 | 6/2016 | | |
|---|---|---|---|---|
| JP | 2009-531196 | 9/2009 | | |
| JP | 2014-201055 | 10/2014 | | |
| WO | 84/02874 | 8/1984 | | |
| WO | 2004/007182 | 1/2004 | | |
| WO | 2009/003662 | 1/2009 | | |
| WO | WO-2009003662 A2 * | 1/2009 | ......... | B29C 47/0026 |

OTHER PUBLICATIONS

Office Action received in related Japanese Application No. 2020-518039, dated Aug. 24, 2020.
Office Action received in related Korean Application No. 210-2020-7011993, dated Jul. 20, 2020.
International Search Report, dated Jan. 8, 2019, received in corresponding PCT Application No. PCT/EP2018/075636.
International Preliminary Report on Patentability, dated Nov. 27, 2019, received in corresponding PCT Application No. PCT/EP2018/075636.

\* cited by examiner

METHOD FOR PRODUCING HOLLOW BODIES MADE OF PLASTICS

FIELD

The invention relates to a method for producing hollow bodies made of plastics by blow molding or deep drawing using a deep drawing tool or a blow molding tool, comprising the extrusion of preforms from thermoplastics, the method comprising a wall thickness control of the preforms.

BACKGROUND

Methods for the wall thickness control of the preforms during extrusion are generally known in the prior art. A basic distinction is made in the wall thickness control between a wall thickness control over the entire circumference or the entire width of the preform (WDS) or over parts of the length or the circumference or the width of the preform (PWDS). The wall thickness control serves to keep volume areas with different amounts of plastic melt ready along the longitudinal direction of a preform, so that hollow bodies with a uniform wall thickness can be produced in the subsequent blow-molding process or deep-drawing process. In the case of extrusion blow molding in particular, preforms are extruded in the direction of gravity above an open tool. As a result, the preforms are elongated due to the weight. When molding or remolding within the tool, there are areas of the preforms that are stretched to different extents, which means that the preform in the tool has different wall thicknesses at different points.

In the case of a so-called axial wall thickness control, a control value curve is normally followed according to the requirements during the preform formation, which controls the passage of the plastic melt by expanding or reducing the nozzle gap. Additionally or alternatively, it can also be provided to change the speed of an extruder screw of an extruder providing the plastic melt in order to increase or decrease the flow.

The material thickness of the preforms is usually controlled in the longitudinal direction and, in the case of complexly molded bodies, frequently also in the circumferential direction by a wall thickness program which takes place during the preform formation. In known methods for wall thickness control, weight measurement is often used as a control variable.

A method for producing hollow bodies made of plastics by blow molding, in which the preform formation is regulated in order to produce a wall profile that changes in the longitudinal direction of the preform, is known, for example, from DE 10 2008 052 608 B3. The method known from this document uses the net weight of the hollow body, the weight of the lower slug and the weight of the upper slug as control variables for the wall thickness control.

The known methods for wall thickness control do not include any feedback from the quality control of the product.

It is generally known to check the wall thickness of the finished hollow body from time to time on a random basis and to adjust the parameters of the extrusion process accordingly.

This procedure inevitably leads to waste in production.

SUMMARY

The invention is therefore based on the object of improving a method for producing hollow bodies made of plastics of the type mentioned at the outset in such a way that a hollow body having a defined wall thickness can be produced with little waste.

One aspect of the invention relates to a method for producing hollow bodies made of plastics by blow molding or deep drawing using a deep-drawing tool or a blow-molding tool, comprising the extrusion of preforms made of thermoplastics, the method comprising a wall thickness control of the preforms, wherein a measurement of the wall thickness of the preforms takes place within the tool on the mold cavity side on at least one reference point of a preform, the measured value obtained is compared as an actual value with a predetermined target value and the wall thickness control is triggered to change the wall thickness of the preform during extrusion or between extrusion cycles depending on the deviations between the actual value and the target value.

The method according to the invention comprises the continuous or discontinuous extrusion of thermoplastics using at least one extrusion head, to which one or more extruders can be connected. Discontinuous extrusion in the sense of the present invention is to be understood as the extrusion of a thermoplastic mass into a storage volume of a so-called storage head which intermittently ejects the composition in the form of a preform. Continuous extrusion in the sense of the present invention and in general is understood to mean that the extruded, plasticized thermoplastic molding composition emerges continuously from an extrusion head. As soon as the preform or preforms have reached a predetermined length, this is removed from the extrusion head and, for example, placed between the open parts of a tool that then closes.

The method may include extruding single or multi-layer preforms. The method may include extruding tubular preforms or sheet-like preforms. The method may include extruding tubular preforms, which are cut and spread into sheet-like preforms immediately upon emerging or after emerging from the extrusion head.

The change in the wall thickness of the preform can be controlled dynamically, i.e. during extrusion, but a change can also be made cyclically. The change can be made by parameterizing a wall thickness program stored in an electronic control and regulating device.

When a plurality of preforms are mentioned in the present patent application, this means both the parallel extrusion of several preforms and the sequential extrusion of several preforms.

In a preferred variant of the method according to the invention it is provided that the preforms are placed as sheet-like plasticized preforms in an open blow-molding tool and are first molded into shell-like intermediate products within the blow-molding tool using the heat of plasticization from the extrusion, wherein the intermediate products are joined together in a further method step to form a closed hollow body, wherein the measurement is carried out after molding the intermediate products when the blow-molding tool is open or closed.

At least one of the shell-like intermediate products is preferably fixed in the open blow-molding tool during the measurement. Such fixation can take place, for example, by applying a negative pressure to the relevant partial cavity of the blow-molding tool. Alternatively, mechanical fixation (undercut, hold-down device) can be provided.

The blow-molding tool used can have, for example, three or more tool parts, of which at least two parts each form partial cavities in which the shell-like intermediate products are formed. According to the inventive method, it can be provided, for example, that two flat, sheet-like preforms made of plasticized thermoplastic are first placed between parts of the tool that each have the partial cavities, and the parts of the tool are closed against a tool divider or intermediate frame arranged between the preforms, and the preforms are inserted into the partial cavities and molded using differential pressure.

In a separate method step, the tools can be opened after the shell-like intermediate products have been shaped and a built-in part or an add-on part can be joined to at least one shell-like intermediate product, the step of joining the built-on part only being carried out if the deviation between the actual value and the target value does not exceed a predetermined variable.

The shell-like intermediate products can be assembled into a finished hollow body by closing the tools again.

The method can be carried out in two or three stages.

In a first step, the parts of the tool can be moved against a tool divider, which is used exclusively to seal the tool in order to first form the shell-like intermediate products with the application of differential pressure. The blow-molding tool can then be opened again and, in a further method step, built-in parts can be joined to the still hot-plastic, shell-like intermediate products, for example by means of a handling robot or by means of a joining frame or any type of center tool. If the previously recorded measured values are not good, in the sense that the wall thickness of the preform at one point or another does not correspond to the predetermined target value, the method according to the invention can be used to discharge the shell-like intermediate products according to the inventive method, which has the advantage that the method step of joining built-in parts is omitted.

Two-stage in the sense of the above explanations means that the method is alternatively carried out with a tool which comprises a center tool, wherein molding of the shell-like intermediate products, the measurement and, if appropriate, the fitting of the built-in parts is carried out after the blow mold halves have initially been closed against the center tool. In a second closing movement, the shell-like intermediate products are welded to one another after the center frame or the tool core between the blow mold halves has been removed.

In this context, three-stage means that the blow mold halves are first moved against a sealing frame, then the intermediate products are shaped, then the blow-molding tool is opened and closed against a joining frame in order to fasten at least one built-in part to at least one shell-like intermediate product. The measurement is carried out immediately after the intermediate products have been molded, i.e. before the second blow mold halves are closed against the joining frame. After the blow mold halves have been opened again, the joining frame is removed and the blow mold halves are closed against one another again for the purpose of joining the shell-like intermediate products.

The installation of the built-in part or add-on part can be carried out by welding and/or riveting. The installation of the built-in part or add-on part can be carried out with the aid of a handling robot or a joining frame which is placed between the opened parts of the tool.

According to the invention it can be provided that the measurement of the wall thickness takes place before the mounting of the built-in part and preferably in the area of a joint surface provided for the built-in part. In the event of welding or riveting of the built-in part, this also ensures that the wall thickness in the area in question is sufficiently dimensioned for welding or riveting.

The measurement is expediently carried out on the mold cavity side, i.e. when the preform in question is molded into a shell-like intermediate product in the respective partial cavity of the tool from that side which faces away from the partial cavity.

The method according to the invention can be carried out using at least one measuring device which is selected from a group of measuring devices comprising tactile sensors, ultrasonic sensors, capacitive sensors, or optical sensors.

As tactile sensors, for example, spring-loaded buttons come into consideration, which can be attached to a joining frame, an intermediate frame, a tool divider or a so-called core as a center tool.

The measurement is preferably carried out with optical sensors, for example with laser sensors. For this purpose, it can be provided, for example, to attach one or more laser sensors for distance measurement to an intermediate frame, a joining frame, or a tool divider. The laser sensors can be mounted in a fixed position, for example on the intermediate frame, and aligned to the inside of the hollow body to be manufactured. The distance to an inside of the shell-like intermediate products can be measured by means of the laser sensors.

The distance from the optical sensor to the inside of the partial cavity in question can be determined by an initial zero position setting of the sensor system, for example at the start of production. The difference between the distance to the partial cavity and the distance to the shell-like intermediate product gives the wall thickness at the corresponding location of the shell-like intermediate product and, if appropriate, the finished hollow body. Such a zero position setting can be carried out from time to time during production, for example at temperatures fluctuating during the day for temperature compensation. The temperatures of the tool can also change during a certain production period and make it necessary to repeat the setting. When setting or calibrating the sensors, it may make sense to take into account an expected shrinkage delay of the cooling hollow body made of plastics, for example in the form of a so-called offset during the setting.

The method preferably comprises carrying out measurements of the wall thickness of the shell-like intermediate product(s) at different points using a plurality of laser sensors.

Suitable laser sensors are, for example, sensors that use a laser light source that illuminate the object to be measured at an angle. An electronic image converter, which is part of the laser sensor, for example a CCD or CMOS sensor or a PSD, registers the scattered light. With knowledge of the beam direction and the distance between the sensor and the light source, the distance from the object to the sensor can be determined. The term laser sensor in the sense of the present application comprises at least one laser light source and an electronic image converter, which has been referred to above as a sensor for the sake of simplicity.

The wall thickness control or wall thickness regulation preferably takes place in that a control and regulating device in the machine control acts on a nozzle gap adjustment on an extrusion head. A program for the wall thickness control can be stored in the control and regulating device, for example, which is run during each cycle. The wall thickness control can take place both axially and radially, over the entire circumference or the entire width of the preform(s) or also over parts of the circumference or the width of the preform(s). The wall thickness control can be carried out dynamically during the extrusion or statically between individual extrusion cycles.

BRIEF DESCRIPTION OF THE DRAWINGS

The invention is explained below with reference to an embodiment shown in the drawings.

DETAILED DESCRIPTION

Figure 1:
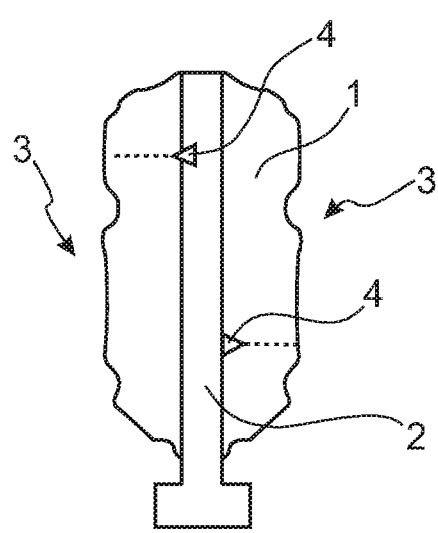
FIG. 1 is a schematic representation of the cavity of a blow-molding tool for producing hollow bodies according to the so-called half-shell method, which illustrates the calibration of the measuring device used in the method.

The method according to the invention is explained below using the so-called half-shell method. This is an extrusion blow molding process, in which two preforms are placed as sheet-like plasticized preforms made of thermoplastics in an open blow-molding tool and are first formed into shell-like intermediate products within the blow-molding tool using the heat of plasticization from the extrusion, wherein the intermediate products are joined together in a further method step to form a closed hollow body. Either a tubular preform is extruded, which is cut lengthwise on opposite sides, or two sheet-like preforms are extruded. The preforms are preferably extruded in the direction of gravity, it being possible for one or more extrusion heads to be arranged directly above the blow-molding tool. As already mentioned at the beginning, the process according to the invention can also be carried out as a conventional extrusion blow molding process or as a deep-drawing process.

In the drawings, the cavity 1 of the blow-molding tool is shown schematically. Parts of the blow-molding tool have been omitted for the sake of simplicity. The blow-molding tool comprises two partial cavities, which are each formed in so-called blow mold halves 3. Each blow mold half 3 is arranged on a mold clamping platen of a blow-molding machine.

The mold clamping platens are in turn arranged on a locking frame and can be moved towards and away from one another via the locking frame. The blow-molding tool further comprises a center tool as an intermediate frame 2 and optionally a joining frame, which can be arranged on a common machine frame.

In FIG. 1, only the empty cavity of the blow-molding tool is shown, the blow mold halves denoted by 3 being closed against the intermediate frame 2. Two laser sensors 4 are attached to the intermediate frame 2, specifically at predetermined positions of the intermediate frame 2 provided for this purpose. FIG. 1 illustrates the process of calibrating the laser sensors 4. The distance from the relevant point of the intermediate frame 2 to the inside of the partial cavities is measured via the laser sensors 4. The process of calibrating or zero position setting of the sensor system, which is illustrated in FIG. 1, is initially carried out at the start of production and then from time to time at irregular intervals. This calibration can be necessary every now and then, for example, to compensate for temperature changes over the course of the day. During the calibration, for example, an offset can also be set which takes into account, for example, the shrinkage delay of the hollow body to be manufactured.

Figure 2:
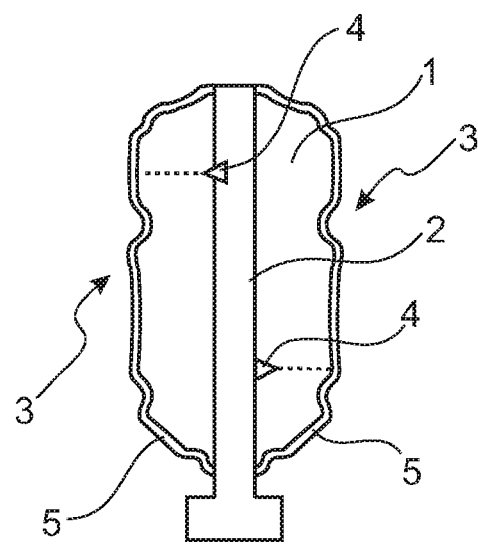
FIG. 2 is a schematic representation corresponding to that in FIG. 1, which illustrates the measurement process.

FIG. 2 illustrates the measurement process during the production method of the hollow body. The measurement process is also carried out by means of the laser sensors 4, whereby, as schematically illustrated in FIG. 2, shell-like intermediate products 5 are already formed in the cavity 1 of the blow-molding tool. The shell-like intermediate products 5 are still in the hot-plastic state in the method step shown in FIG. 2 and are optionally fixed in the partial cavities using negative pressure. While the shell-like intermediate products 5 are in the state shown in FIG. 2 and the blow mold halves are closed against the intermediate frame, the measurement process is carried out. The distance is measured in each case from the relevant laser sensor 4 of the intermediate frame to a reference point on the inside, i.e. the side pointing into the cavity, of the shell-like intermediate product 5. The difference between a measurement with an empty tool and a measurement immediately after the shell-like intermediate products 5 have been formed results in the wall thickness of the shell-like intermediate product 5.

The measured value is supplied to a regulating and control device, depending on the deviation from a given target value, the wall thickness control is triggered correspondingly in order to realize an action in the control or an action in a wall thickness program.

Reference points are selected as reference points in the sense of the invention, which are critical for the wall thickness of the finished hollow body or for the installation of built-in parts or add-on parts.

Figure 3:
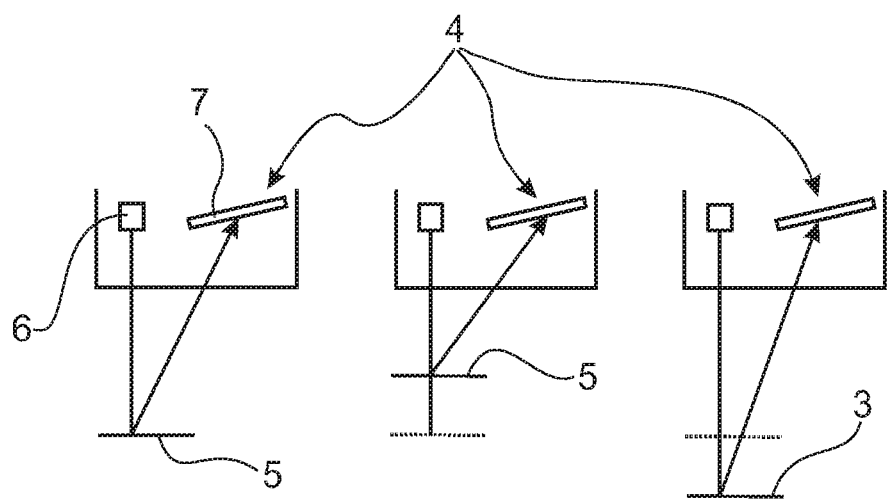
FIG. 3 is a schematic representation of a laser sensor during the measurement process, which illustrates the operation of the laser sensor.

FIG. 3 illustrates the laser measurement method using a laser sensor 4. The method is carried out as a triangulation process. A laser beam emitted from a laser light source 6 strikes an object at an angle, in the present case the shell-like intermediate product 5 formed in the partial cavity, is reflected by the latter and detected by an electronic image converter 7. The connection between the light rays from and to the object forms a triangle, which enables the geometric determination of the distance to the object.

REFERENCE NUMERALS 1 cavity
2 intermediate frame
3 blow mold halves
4 laser sensors
5 intermediate products
6 laser light source
7 electronic image converter

What is claimed is:

1. A method to produce hollow bodies made of plastics by blow molding, comprising:
   extruding preforms from thermoplastics from a plurality of extrusion cycles,
   providing a wall thickness control of the preforms,
   placing the preforms as plasticized preforms in an open blow-molding tool,
   forming the preforms into intermediate products within a mold cavity of the blow-molding tool using heat of plasticization from the extrusion,
   measuring a wall thickness of at least one of the intermediate products within the blow-molding tool, from a mold cavity side of the blow-molding tool, using at least one reference point of at least one of the intermediate products, to obtain a measured value which is compared as an actual value to a predetermined target value, and which triggers the wall thickness control to change a wall thickness of at least one of the preforms between the extrusion cycles depending on a deviation between the actual value and the target value.

2. The method according to claim 1, further comprising joining the intermediate products together to form a closed hollow body.

3. The method according to claim 2, further comprising joining at least one built-in part to at least one of the intermediate products before the intermediate products are joined to form the hollow body, wherein the measurement of the wall thickness takes place before joining of the built-in part and wherein joining the built-in part is only carried out if the deviation between the actual value and the target value does not exceed a predetermined deviation.

4. The method according to claim 1, wherein the intermediate products are fixed within the blow-molding tool during the measurement.

5. The method according to claim 1, wherein the measurement is carried out by at least one measuring device comprising a tactile sensor, an ultrasonic sensor, a capacitive sensor or an optical sensor.

6. The method according to claim 1, wherein the measurement is carried out by at least one measuring device which is installed on a tool divider, a joining frame or an intermediate frame of the blow-molding tool at at least one measuring point.

7. The method according to claim 6, wherein the measurement is carried out as an optical measurement.

8. The method according to claim 1, wherein the wall thickness control causes a nozzle gap adjustment on an extrusion head.

9. The method according to claim 1, wherein a zero position setting or calibration of the measuring device is provided.

10. The method according to claim 1, wherein the intermediate products are discharged by a given amount in an event of a discrepancy between the actual value and the target value.

11. The method according to claim 1, wherein the measurement of the wall thickness of the intermediate products is carried out within the blow-molding tool when the blow-molding tool is open.

12. The method according to claim 1, wherein the measurement of the wall thickness of the intermediate products is carried out within the blow-molding tool when the blow-molding tool is closed.

13. The method according to claim 3, wherein the measurement of the wall thickness takes place in an area of a joint surface provided for the built-in part.

14. The method according to claim 5, wherein the optical sensor is a laser sensor.

15. The method according to claim 7, wherein the optical measurement is carried out as a laser measurement.

16. The method according to claim 9, wherein the zero position is an initial zero position.

17. The method according to claim 9, wherein the zero position is a repeated zero position.

18. The method according to claim 1, wherein the plasticized preforms are sheet plasticized preforms.

19. The method according to claim 1, wherein the intermediate products are shell intermediate products.

* * * * *